United States Patent [19]

Snow

[11] 4,028,537

[45] June 7, 1977

[54] PRODUCT PROCESSING SYSTEM WITH PRICE PRINTER

[75] Inventor: John E. Snow, Minneapolis, Minn.

[73] Assignee: Champion International Corporation, Stamford, Conn.

[22] Filed: Mar. 31, 1976

[21] Appl. No.: 672,055

[52] U.S. Cl. .............................. 235/61.9 R; 101/35
[51] Int. Cl.² .................... G06K 3/02; G06K 19/06
[58] Field of Search .............. 235/61.11 E, 61.9 R, 235/61.9 A; 101/DIG. 16, DIG. 3, 35

[56] References Cited

UNITED STATES PATENTS

| | | | |
|---|---|---|---|
| 3,356,021 | 12/1967 | May et al. | 235/61.9 R |
| 3,735,350 | 5/1973 | Lemelson | 235/61.11 E |
| 3,822,375 | 7/1974 | Ozeki | 235/61.9 R |

OTHER PUBLICATIONS

"Boxboard Containers" p. 34, Feb. 75 Issue.

Primary Examiner—Vincent P. Canney
Attorney, Agent, or Firm—Evelyn M. Sommer

[57] ABSTRACT

A printer is controlled in response to product identifying codes carried on products being processed to imprint price information on the product for the benefit of consumers.

3 Claims, 3 Drawing Figures

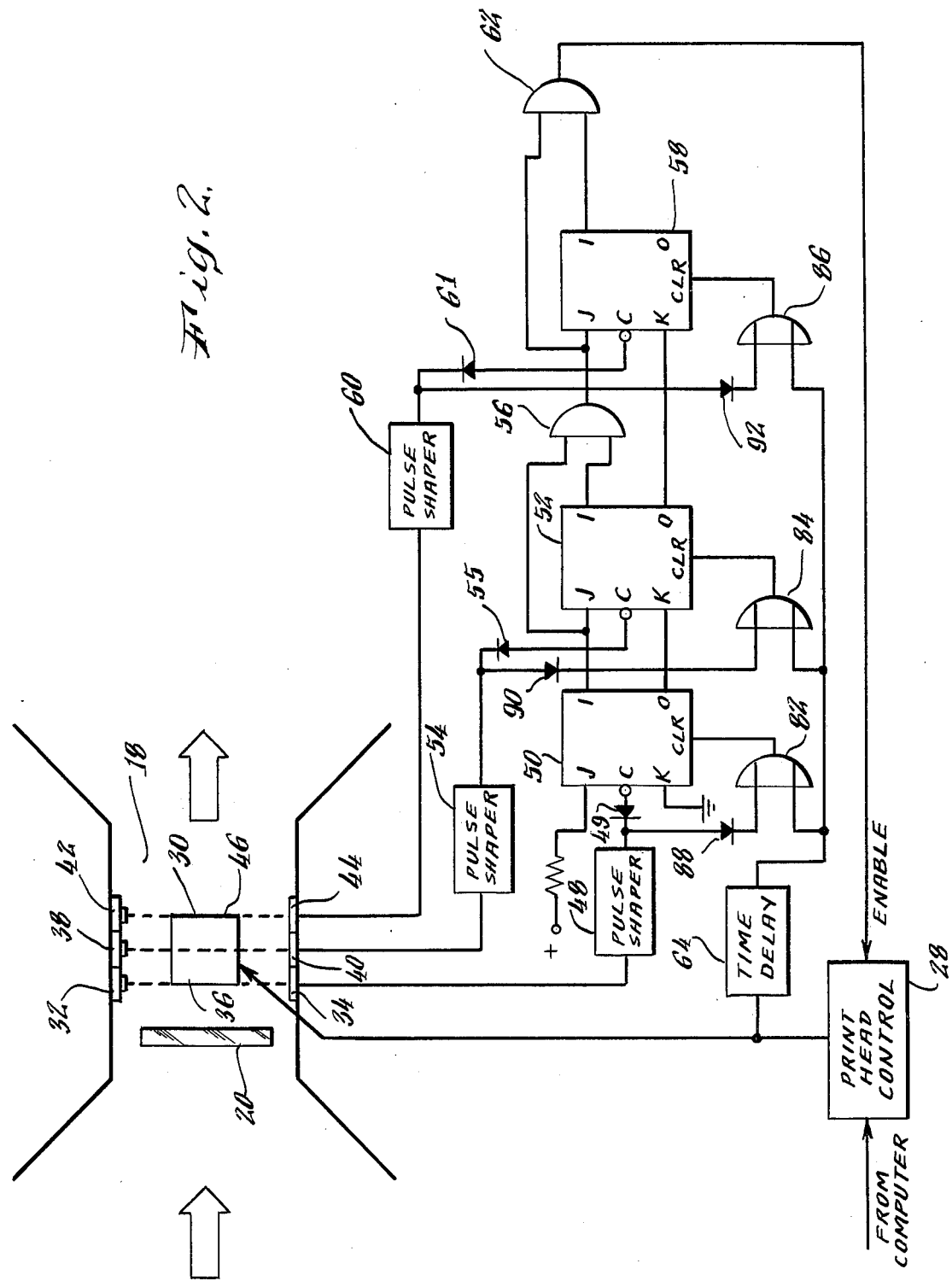

PRODUCT PROCESSING SYSTEM WITH PRICE PRINTER

BACKGROUND OF THE INVENTION

The present invention relates to the processing of products and more particularly to a product processing system including a printer for imprinting price information on the products.

In recent years much progress has been made toward automating the checkout process employed in stores of the supermarket type. Most stores will employ checkout clerks who, after finding a price on a product, manually enter prices and simple product information into a register. However, automated systems have been developed in which an automatic label reader detects coded symbols carried on the products. These patterns of symbols, which differ for each different product, are converted into electronic signals which are applied to a computer wherein current prices are stored for all products carried in the store inventory. Signals identifying the product and the price for the product are applied to a register which totals the prices and typically prepares a list or tape of the prices and abbreviated product designations.

There are several recognized advantages to such automated checkout systems. A consumer's checkout time is significantly reduced since the checkout clerk does not have to find and manually enter product and price information into a register. All the clerk has to do is move the product symbols past the automatic label reader which many scan the symbols through a viewing window in the surface or deck of the checkout stand. The chances of human error inherent in the manual entry of prices into the register are also reduced. Also, since the prices employed in the totalling process are stored in and retrieved from computer memory, it is not necessary to mark each individual product on the shelves. A single sign attached directly to the shelves will indicate the current price of the product to the consumer.

Eliminating the requirement that individual products be marked should result in substantial labor cost savings for a store since the manual marking process is time consuming and often futile as products may need to be re-marked one or more times to reflect price changes occurring after the products are placed on the shelves. Also, manual marking of prices on individual products increases the chances that products will be wrongly marked to the detriment of either the consumer or the store.

Another advantage of automated checkout systems of the type described is that the detailed product information fed to a store computer upon scanning the labels carried on the products may be used in the automatic re-ordering and control of store inventory.

However many advantages automatic checkout systems may have for stores, the consumer acceptance of such systems has been less than complete. One reason is that consumers are accustomed to seeing prices printed on products and to remembering such prices by associating them with the product shape, size or container appearance. Consumers find this useful in comparison shopping. Since a consumer is not as likely to remember a price which appears only on a cash register tape, comparison shopping is made more difficult.

Another reason why consumers may not be more readily accepting automated checkout systems, is that the consumer is basically forced to accept a store's representation that the price appearing on the shelf sign is the same price stored in the computer memory and used in the register. It may not be particularly helpful to most consumers that prices of products being checked are momentarily displayed on a register since most consumers would have difficulty in remembering whether the price displayed on the register is the same price which appeared on the shelf sign.

SUMMARY OF THE INVENTION

The present invention enhances the acceptability of automated product checkout systems without requiring a return to the inefficient and costly practice of manually marking each product sold in the store.

The invention is an improvement in the type of systems which include an automatic label reader for reading product-carried codes to generate product-identifying signals. These signals are applied to a computer which matches the product-identifying signal to stored signals representing the current prices for the identified products. The current prices are retrieved for use in the process. The improvement comprises a printing means adjacent the label reader. The printing means is controlled by price signals generated by the computer to print a visual representation of the price directly on the product being checked out.

DESCRIPTION OF THE DRAWINGS

While the specification concludes with claims particularly pointing out and distinctly claiming that which is regarded as the present invention, further details of preferred embodiments of the invention may be more readily ascertained from the following detailed description when read in conjunction with the accompanying drawings wherein:

FIG. 2 is a schematic representation of electronic circuitry which assures operation of the printing means at the proper time.

DETAILED DESCRIPTION

Figure 1:
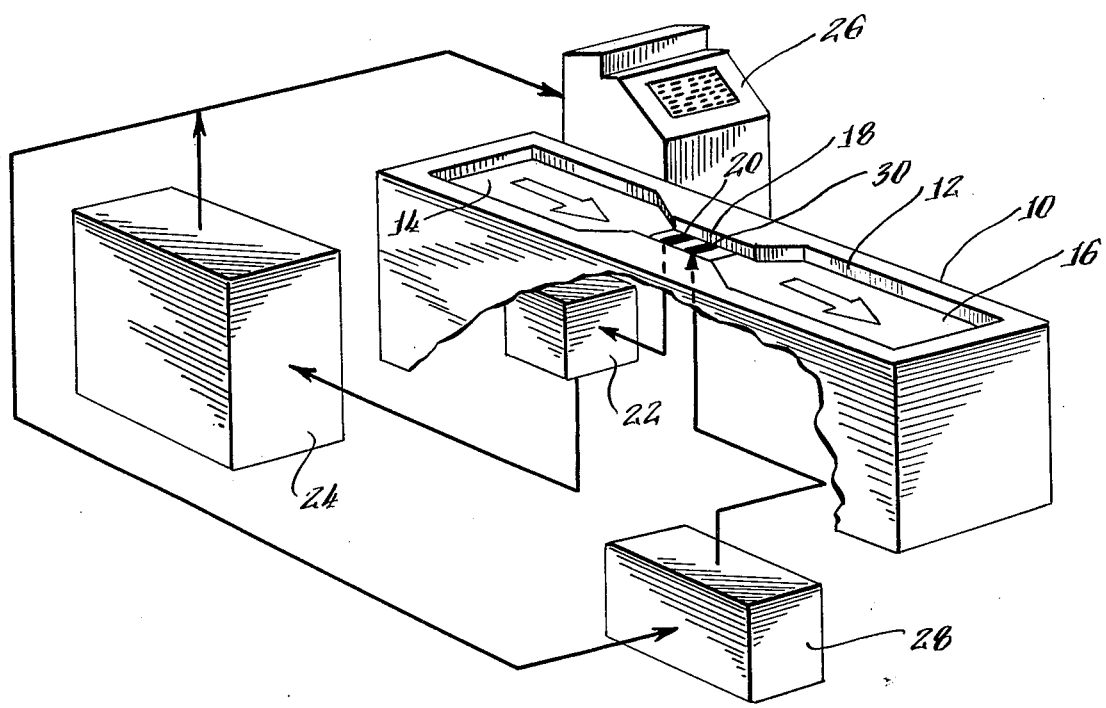
FIG. 1 is a simplified perspective view of a checkout system incorporating the present invention.

Referring to FIG. 1 a checkout stand 10 includes a deck 12 on which products being checked out are transported in the direction of the arrows by means of a first conveyor belt 14 and a second conveyor belt 16. The side walls of the stand 10 extend inwardly at the midpoint of the stand to form a narrow passage 18 intended to accept one product at a time from the conveyor belt 14. An automatic label reader, which may be conventional in nature, includes a viewing window 20 which is flush with the deck 12 in narrow passage 18.

Products passing over viewing window 20 generally carry visible product-identifying codes such as the Universal Product Code, which consists of parallel bars, the spacing and width of which vary as a function of the numeral represented by the bars. The visible code on each product is detected through the viewing window by an optical-to-electrical transducer which converts the code pattern to a set of product-identifying electrical signals at the reader 22. This set of signals is applied by reader 22 to a computer 24 having a memory unit wherein a current price is stored for each product carried in inventory. Computer 24 retrieves the current price for the identified product and outputs a set of price-indicating signals to a register 26. This register contains a printing mechanism for preparing a list of prices of the products being processed. Preferably, the register printing mechanism can also print an abbreviated identification for each product.

The system, as described thus far, is considered to be conventional. Details of such systems may be found in a number of U.S. Patents including Pat. No. 3,663,800, issued May 16, 1972, and U.S. Pat. No. 3,806,706, issued Apr. 23, 1974.

The present invention improves upon such systems by including a printing means for imprinting price information directly on the products as they are processed. The output signals from computer 24 are applied not only to register 26 but also to a print head control 28 which controls the energization of a print head 30. The face of print head 30 is preferably flush with deck 12 in the narrow passage 18.

The print head 30 should be close to viewing window 20. The particular type printing mechanism employed is not critical to the practice of the present invention. The printer may be a conventional impact printer of a conventional non-impact printer; e.g., an ink jet printer. Non-impact print heads may be preferred since products moving over the print head 30 may present irregularly spaced print-receiving surfaces which would make it difficult for conventional impact printers to form a readily-readable price mark.

The product being processed is identified as it moves over viewing window 20. However, the printing of the retrieved price cannot occur until the product moves into position above the print head 30. FIG. 2 illustrates a circuit which enables operation of the printing means only when the product is directly above the print head 30.

A first photoelectric detector includes a light source 32 and a photocell 34 located on opposite sides of the narrow passage 18. The light source 32 and photocell 34 establish a light barrier across narrow passage 18 at the leading edge 36 of the print-head 30. A second light source 38 and associated photocell 40 provide a light barrier across narrow passage 18 at the center of print head 30. A third light source 42 and associated photocell 44 establish a light barrier at the right edge 46 of print head 30.

Photocell 34 is connected to a pulse shaping circuit 48, the function of which is to convert step signals at the output of photocell 34 to pulses. When such pulses are applied to diode 49, this diode will pass only negative-going pulses suitable for clocking flip-flop 50. Negative-going pulses are generated whenever a product first interrupts the light beam from a light source to its associated photocell. Flip-flop 50 may be a conventional J-K flip-flop. The J input terminal of flip-flop 50 is connected to a positive voltage source while its K input terminal is connected to ground. With the J and K inputs preset to the stated potentials, flip-flop 50 is triggered from a reset state to a set state when a negative-going pulse is applied at the clock or C input terminal. In the set state the voltage on the normal or "1" output terminal assumes a binary 1 level while the voltage on the inverted or "0" output terminal assumes a binary 0 level.

The normal output of flip-flop 50 is connected to the J input terminal of a second flip-flop 52. Similarly, the inverted output of flip-flop 50 is connected to the K input terminal of flip-flop 52. The clock input of flip-flop 52 is connected to a diode 55 in series with pulse shaping circuit 54, the input to which is provided by the photocell 40. The normal output terminal of flip-flop 52 provides one input to a dual-input AND gate 56, the second input to which is connected to the normal output of the first flip-flop 50. The output of AND gate 56 is connected to the J input terminal of a third flip-flop 58. The K input of flip-flop 58 is connected directly to the inverse output terminal of flip-flop 52. The clock input of flip-flop 58 is connected to a diode 61 in series with pulse shaping circuit 60. The input to pulse shaping circuit 60 is provided by the photocell 44 at the trailing edge of print head 30.

The normal output of flip-flop 58 and the output of AND gate 56 provide inputs to a dual input AND gate 62. The output of AND gate 62, characterized as an "enable" signal, is applied to the print head control 28. The output of print head control 28 is applied both to the print head 30 and to a time delay circuit 64 having outputs to a number of OR gates 82, 84, 86. A second input to OR gate 82 is provided through a diode 88 connected to the output of pulse shaping circuit 48. Similarly, pulse shaping circuits 54 and 60 provide inputs to OR gates 84 and 86, respectively, through diodes 90 and 92. Due to their orientation, diodes 88, 90 and 92 will pass only positive-going pulses. Such pulses will be generated whenever a product is taken out of the path between a light source and its associated photocell.

The circuit described above operates on the following manner to assure that the print head operates only when a product is in position above the head. Initially, each of the flip-flops 50, 52 and 58 is in a reset state wherein the signal on its normal output terminal is a binary 0. Under these conditions neither input to AND gate 62 is at a binary 1, and AND gate 62 cannot generate the binary 1 signal needed to energize the print head 30. When a product passes over viewing window 20 in the direction indicated by the arrows, the system described with reference to FIG. 1, and specifically the computer 24, generates price-indicating signals which are applied to the print head control 28. These signals are held in storage in the print head control 28. When the product crosses the light barrier between light source 32 and photocell 34, the output of photocell 34 decreases in a step function. The step function signal is converted to a negative-going pulse by pulse shaping circuit 48. Diode 49 passes this negative-going pulse to flip-flop 50, driving the flip-flop into its set state. The outputs from set flip-flop 50 are preset flip-flop 52. When the product reaches the light barrier extending between light source 38 and photocell 40, the negative-going step signal produced by photocell 40 is converted to a negative-going pulse which is passed through diode 55 to drive flip-flop 52 into its set state. When both flip-flops 50 and 52 are set, AND gate 56 produces a binary 1 output signal which, when applied to the J input terminal of flip-flop 58, presets that flip-flop.

When the leading edge of the product reaches the light barrier formed by light source 42 and photocell 44, a negative-going pulse generated in pulse shaping circuit 60 is passed to the clock input terminal of flip-flop 58 through diode 61 to drive that flip-flop to a set state. When all three flip-flops 50, 52, 58 are in a set state, both inputs to AND gate 62 are at a binary 1 level. Consequently, the output of AND gate 62 will rise to the binary 1 level needed to enable the print head control.

To reduce the chances that an erroneous enable signal will be generated when an object, such as a pencil, is accidentally dropped on the deck or when a product is prematurely moved out of position above the print heat 30, the flip-flops 50, 52 and 58 are reset either after a "print" signal from print head control 28 or upon the generation of a positive pulse in the associated pulse shaping circuit. Such pulses, generated only when the light barrier is re-established after having been interrupted are passed through diodes 88, 90, 92 and respective OR gates 82, 84, 86 to immediately reset the associated flip-flops.

Since the product must be intercepting all three light beams in order for the enable signal to be generated, a surface of the product must necessarily be above the print head. Thus a complete visual representation of the price will always appear on a product surface.

To clear the timing mechanism after a normal print operation in preparation for the next product, a time delay circuit 64 responds to the output of print head control 28 by generating a clearing signal after a short delay. This signal resets flip-flops 50, 52 and 58.

Figure 3:
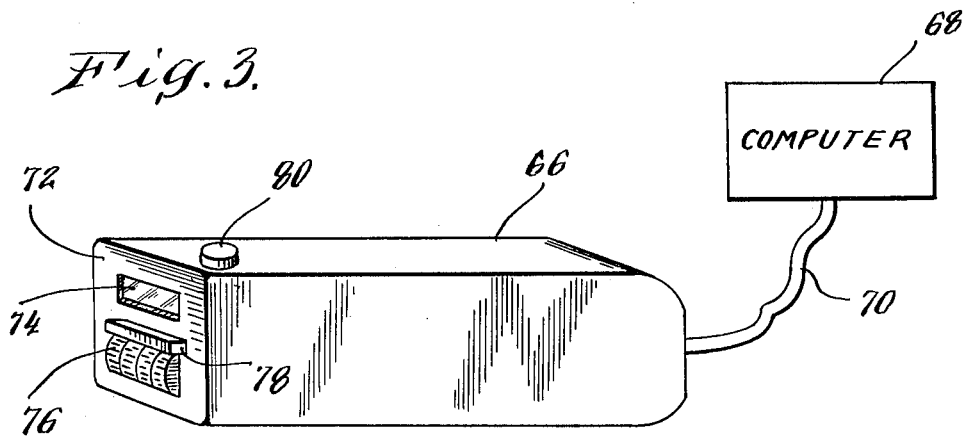
FIG. 3 is a representation of an alternate embodiment of the invention for stockroom use.

The above-described embodiment of the invention is suitable for use at a checkout stand. An alternate embodiment described briefly with reference to FIG. 3 is suitable for use in price marking products before those products are placed on store shelves. Since products to be placed on store shelves are ordinarily packaged in larger cases or boxes, and since it would be inconvenient to remove the products from those cases or boxes, this embodiment of the invention comprises a hand-held instrument 66 which is electrically coupled to a store computer 68 through an electric cable 70. A face 72 of the instrument 66 includes a viewing window 74 through which an automatic label reader can detect product codes appearing on the products contained within opened cases. When the product codes are processed by computer 68, the resulting price signals are fed back to the instrument 66 to set the printer. Only a print head 76 is illustrated. With non-impact print heads and most types of impact print heads, some means must be provided for energizing the print head when it is in a suitable print position. A pressure switch can include a bar 78 extending from the face 72 of the instrument 66. The print head 76 is actuated when a stock clerk brings the instrument face 72 into contact with the product to be printed, causing bar 78 to retract and close a switch is an enabling circuit.

Obviously, it would be inefficient to require that a product code be detected for each unit of the product before a price could be marked on that product. In the alternate embodiment of the invention, only one product code need be sensed. The print head would be set to the proper price and would continue to print that price upon contact with each unit of the product. A push button 80 is provided on the upper surface of the instrument 66. When a store clerk has finished marking all products of the identified type, the push botton 80 may be depressed to clear the instrument, readying it for use on another product.

While there have been described what are considered to be preferred embodiments of the present invention, variations and modifications will occur to those skilled in the art once they become familiar with the basic concepts of the invention. Therefore, it is intended that the appended claims shall be construed to include all such variations and modifications as fall within the true spirit and scope of the invention.

What is claimed is:

1. A product check out system comprising:
   a. a checkout stand including therein an automatic label reader means disposed on an upper surface thereof, said label reader means being capable of reading a plurality of universal product codes carried on said products and generating product-identifying signals corresponding thereto as each product is moved pass said label reader;
   b. computer means responsive said product-identifying signals for generating price signals as a function of product prices currently stored in the memory of said computer;
   c. register means for totalling said price generated in the course of processing an aggregation of products; and
   d. printing means disposed in close proximity to said label reader means for printing visual representations of the price on said product in accordance with said price signals.

2. A hand-held product marking system comprising:
   a. a housing adapted to be held in the hand, said housing including therein an automatic label reader means for reading a plurality of universal product codes carried on said products and generating product-identifying signals corresponding thereto as said housing is moved pass said universal product codes;
   b. computer means responsive to said product-identifying signals for generating price signals as a function of the product prices currently stored in the memory of said computer; and
   c. printing means disposed in said housing in close proximity to said label reader means for printing visual representation of the price on said product in accordance with said price signals.

3. A hand-held product marking system according to claim 2 further including means for retaining said visual representation for a plurality of printings thereof and reset means for permitting said printing means to reset to a new visual representation for printing in accordance with a new price signal.

* * * * *

UNITED STATES PATENT AND TRADEMARK OFFICE
CERTIFICATE OF CORRECTION

PATENT NO. : 4,028,537
DATED : June 7, 1977
INVENTOR(S) : John E. Snow

It is certified that error appears in the above-identified patent and that said Letters Patent are hereby corrected as shown below:

Column 2, line 47, after "deck" insert -- or upper surface --.

Column 3, line 23, after "printer" insert -- or -- and delete "of".

Signed and Sealed this thirtieth Day of August 1977

[SEAL]

Attest:

RUTH C. MASON
Attesting Officer

C. MARSHALL DANN
Commissioner of Patents and Trademarks